United States Patent [19]
Bergman

[11] Patent Number: 5,783,745
[45] Date of Patent: Jul. 21, 1998

[54] ANEMOMETER/THERMOMETER

[76] Inventor: John D. Bergman, 1307 "C" St., Antioch, Calif. 94509

[21] Appl. No.: 805,555

[22] Filed: Feb. 26, 1997

[51] Int. Cl.$^6$ .................... G01P 5/18; G01W 1/02
[52] U.S. Cl. .................... 73/170.13; 73/170.11
[58] Field of Search .................... 73/170.05, 170.07, 73/170.11, 170.13, 861.85, 861.26

[56] References Cited

U.S. PATENT DOCUMENTS

| | | | |
|---|---|---|---|
| 2,928,277 | 3/1960 | Cavanagh et al. | 73/170.13 |
| 3,435,677 | 4/1969 | Gardner | 73/170.13 |
| 3,548,653 | 12/1970 | Corey | 73/170.13 |
| 3,633,415 | 1/1972 | Luce | 73/170.13 |
| 4,031,756 | 6/1977 | Rotier et al. | 73/170.13 |
| 4,038,870 | 8/1977 | Rotier | 73/170.13 |
| 4,320,666 | 3/1982 | Redding | 73/861.28 |
| 5,343,744 | 9/1994 | Ammann | 73/170.13 |
| 5,373,736 | 12/1994 | Brown | 73/170.13 |

FOREIGN PATENT DOCUMENTS

| | | | |
|---|---|---|---|
| 35-5160869 | 12/1980 | Japan | 73/170.11 |

*Primary Examiner*—Ronald L. Biegel
*Attorney, Agent, or Firm*—Townsend and Townsend and Crew

[57] ABSTRACT

Wind for speed, direction, and temperature measurement is passed along a plane. A sound wave generating transducer (speaker) is addressed to the plane. At least two, and preferably three sound wave receiving transducers (microphones) surround the sound wave generating transducer and are preferably located on the plane. A phase locked loop circuit maintains the same sound wave length between the sound wave generating transducer and one fiducial sound wave receiving transducers. By noting differing phase of sound wave at the two remaining sound wave receiving transducers, temperature compensated wind speed and direction can be determined. Additionally, and with the input of the change of frequency necessary to maintaining the same sound wave length between the sound wave generating transducer and the one fiducial sound wave receiving transducer, temperature of the passing air can be determined. In the preferred embodiment, a sound reflector plane overlies and underlies the plane within which the wind to be measure passes. This latter configuration decreases instrument sensitivity to surrounding obstacles. A highly accurate, durable, compact and temperature insensitive sonic anemometer/thermometer is disclosed.

8 Claims, 3 Drawing Sheets

ANEMOMETER/THERMOMETER

This invention relates to anemometers. More particularly, an anemometer is disclosed having solid state parts using acoustical signals to resolve wind speed, wind direction and air temperature. The disclosed anemometer measures temperature as a function of the speed of sound in air. All measurements are independent of the temperature of the measuring instrument.

BACKGROUND OF THE INVENTION

The speed of sound in air is well known. Generally, the speed of sound, in a gas is:

$$V = \frac{\sqrt{\gamma P}}{\rho} \quad (1)$$

Where $\gamma$ accounts for the ratios of specific heats, P is the pressure and $\gamma P$ is effectively the modulus of elasticity of the gas while $\rho$ is simply the density.

The speed of sound in a gas is unaffected by barometric pressure because the density is changed in the same proportion, thereby leaving the ratio of pressure to density unaffected. Changes in temperature, however, affect the density without influencing the pressure, and hence cause a change in the speed of propagation of a sonic wave front. An inspection of the Ideal Gas Law, $$VP = nRT \quad (2)$$

shows that the density of a gas, n/V (here V is volume), varies inversely as the absolute temperature, T. From this fact and equation (1), it follows that:

$$V \propto \sqrt{T} \quad (3)$$

Consequently, the ratio of velocities of sound becomes:

$$\frac{V_1}{V_2} = \sqrt{\frac{T_1}{T_2}} \quad (4)$$

Since the velocity of sound is 331.3 m/s at a temperature of 0° Celsius or 273.15° Kelvin, using equation (4), It can be shown that:

$$V = 20.047 \times \sqrt{T} \quad \frac{m}{s} \quad (5)$$

Devices that determine wind speed and direction by utilizing the propagation of sound through air are well known. As far as the author can determine, most sonic wind vector measuring devices reported in the scientific literature are variants of the same idea. Generally, an instrument of this type has an opposing pair of sonic transmitter/receiver heads which are spaced a known distance apart. A sonic pulse is transmitted from one head (A) and propagates through the air to be received at the opposing head (B). The time of travel is measured and recorded by the instrument, $t_1$. A second sonic pulse is then transmitted from head B and propagates to head A, which now acts as the receiver. The time of travel is again measured and recorded, $t_2$. Because the time of travel of a sonic pulse will change in proportion to the wind velocity, the wind velocity between the two heads can be calculated knowing the time of travel in both directions.

Travel time of sonic pulses $t_1$ and $t_2$:

$$t_1 = \frac{L}{V+W} \quad t_2 = \frac{L}{V-W} \quad (6)$$

Where L Is the distance between transducer heads, V is the speed of the pulse and W is the wind speed.

Combining time equations and solving for the wind speed, W, between transmitter/receiver heads yields:

$$W = \frac{L}{2} \times \frac{(t_2 - t_1)}{(t_1 \times t_2)} \quad (7)$$

where:

$t_1$ is the time interval from first transducer, A, to second transducer, B.

$t_2$ is the time interval for second transducer.

L is the distance between the first and second transducers; and

W is the speed of wind along a vector measured between the two transducers.

It will be apparent to the reader that this technique, with the use of the Pythagorean theorem, can be expanded to as many as three dimensions with the addition of one more transmitter/receiver pair per dimension, which are, preferably, but not necessarily, arranged to be mutually orthogonal to each other and the plane which is parallel to the ground.

It is important that the reader understand that the prior art, whether using the above described technique or not, operates by emitting and receiving a pulse of sound energy. A pulse of sound energy is composed of a group of oscillations that is, therefore, at least several wavelengths long, propagating through the air at the speed of sound from a transmitting transducer to a receiving transducer. This fact necessitates that the transmitting and receiving transducers be separated by many wavelengths, indeed, as much as yards, depending on the required resolution of the particular application. The greater the transducer separation, the more "ticks" of the instruments' timing clock during the interval between pulse transmission and reception, providing high instrument resolution.

Unfortunately, these prior art systems have severe disadvantages. First, the use of transducers that both "listen" and "speak" are generally required. Secondly, the transducers are often directed towards one another. Inevitably, at least some of the transducers will face into the wind which they are trying to measure. Also, the overall size of the instrument is comparatively large, on the order of a few inches to several yards.

In what follows, I disclose a totally new approach to these devices.

SUMMARY OF THE INVENTION

Wind for speed, direction, and temperature measurement is passed along a plane for two dimensional wind vector and temperature measurement. A sound wave generating transducer (speaker) is addressed to the plane. Three sound wave receiving transducers (microphones) surround the sound wave generating transducer and are preferably located on the plane. In contrast to prior art, the disclosed technique does not operate by sending pulses of sound from transmitting transducer to receiving transducer while measuring and recording the time interval of travel. My technique utilizes a continuous wave, variable frequency method. The sound wave generating transducer emits a continuous wave of sound energy which is variable in frequency or, equivalently, wavelength. A phase locked loop circuit maintains a constant, whole or fractional, sound wavelength between the sound wave generating transducer and one fiducial sound wave receiving transducer. The relative phases of the received sound wave from the remaining two sound wave receiving transducers are compared to the phase of the wave which drives and is emitted by the sound wave generating transducer. The two relative phases are converted to phase proportionate voltages and read by a computer to determine temperature compensated wind speed and direction. The temperature of the wind is determined when the computer reads a third voltage which is proportional to the sound wave frequency necessary to maintain a constant sound wavelength between the sound generating transducer and the one fiducial sound wave receiving transducer.

Measurement of the relative phase of the received sound wave while using no clocks provides for wind vector and temperature data which is essentially continuous in time.

Additionally, since my technique utilizes the relative phase of the received sound wave and does not measure and record the time interval between sound pulses, sound receiving transducers may be placed very close to the sound transmitting transducer. The receiving transducers may be placed as close as a single or fractional sound wavelength from the transmitting transducer. This fact facilitates the construction of extremely small wind measuring instruments. For example, at a nominal 100 khz (ultrasonic) sound oscillation frequency, the size of a two dimensional wind vector and temperature measuring instrument using this technology is on the order of that of a dime.

In the preferred embodiment, a sound reflector plane overlies and underlies the plane within which the wind to be measured passes. This latter configuration decreases instrument sensitivity to any surrounding obstacles which may cause phase noise due to constructive and destructive wave interference.

An arbitrarily small, high resolution, highly durable, temperature insensitive anemometer/thermometer with no moving parts is disclosed.

DESCRIPTION OF THE PREFERRED EMBODIMENT

Figure 1:
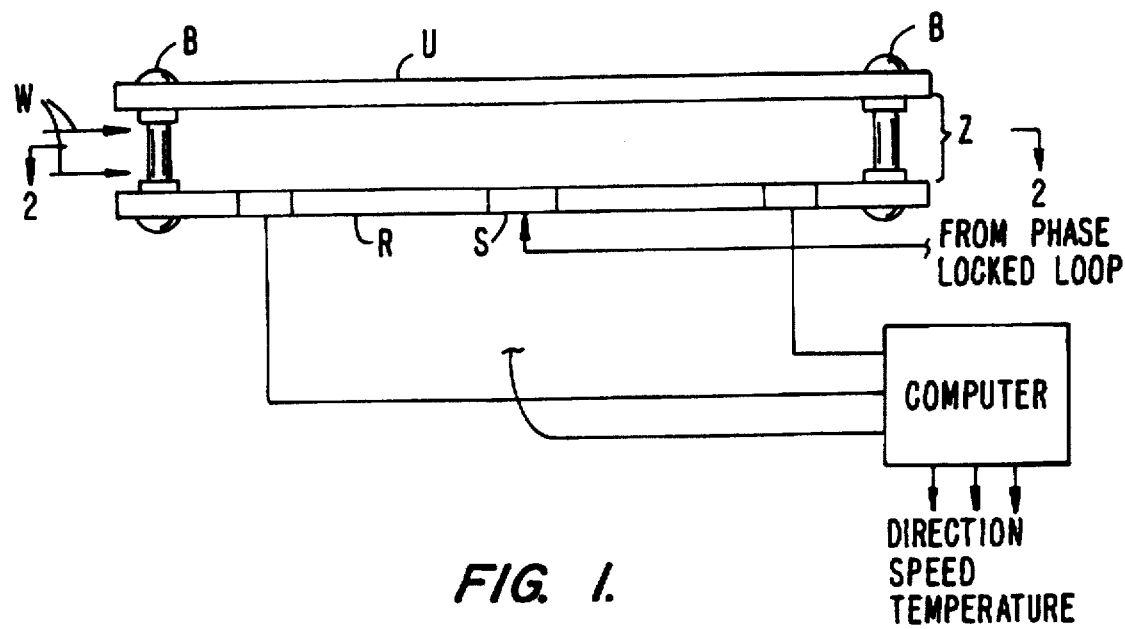
FIG. 1 is a side elevation of the speed, direction and temperature measuring instrument pertaining to this invention.
Figure 2:
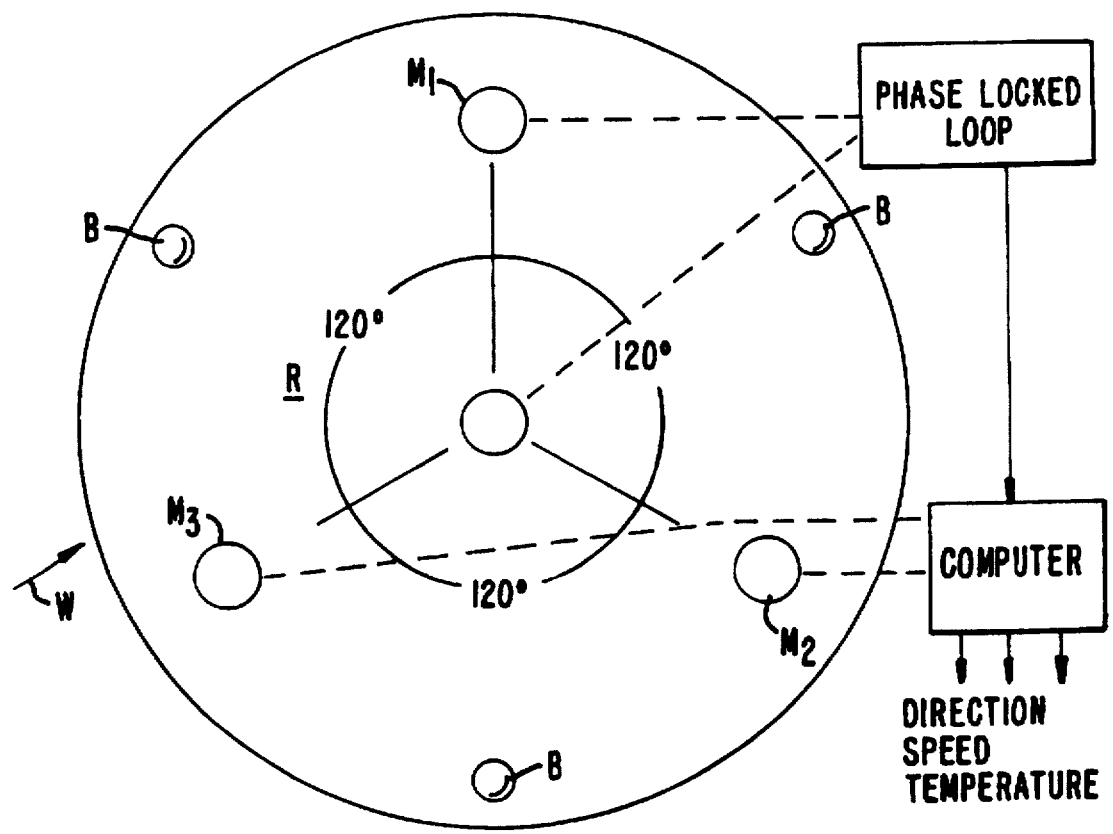
FIG. 2 is a plan view of the temperature measuring instrument along lines 2—2 of FIG. 1.

Referring to FIGS. 1 and 2, the simple construction of this two dimensional anemometer/thermometer can be understood. Specifically, lower support acoustical reflector R and upper support acoustical reflector U are spaced apart by vertical distance Z. These respective acoustical reflectors are spaced apart by spacing bolts B.

Centrally of lower support acoustical reflector R there is mounted speaker S. Surrounding speaker S at preferred 120° intervals are first microphone $M_1$, second microphone $M_2$, and third microphone $M_3$. Simply stated, speaker S emits sound; the respective first microphone $M_1$, second microphone $M_2$, and third microphone $M_3$ receive the sound. Presuming that a wind is blowing, measuring the "apparent source of origin" of the sound and the frequency of oscillation, the wind speed, wind direction, and air temperature can all be determined.

It will be noted that as disposed, microphones M all are normal to the traversing wind stream. This is to be distinguished from the majority of the prior art where the transducers must send and receive signals facing one another.

Special attention should be given to the case of first microphone $M_1$ and speaker S. Specifically, in the preferred embodiment, it is required for the operation of this invention that the same number of wavelengths exists between first microphone $M_1$ and speaker S. Accordingly, phase locked loop circuit 14 maintains a constant number (or fractional number thereof) of wavelengths between first microphone $M_1$ and speaker S regardless of any potentially variable wind speed or temperature parameters. The phase locked loop circuit 14 maintains constant wavelength distance by continuously varying the output frequency of speaker S. As will here after be immediately understood, this relatively simple concept permits both simplified calculation of wind speed and temperature while enabling the anemometer/thermometer of this invention to operate in a wide range of a temperature conditions.

It is necessary that computer C receive and compute from the frequency that speaker S operates and the two respective phases of the sound wave from the speaker arriving at second microphone $M_2$ and third microphone $M_3$ the speed, direction, and temperature.

In the following specification, we will first discuss the mathematical derivations which follow from the above outlined configuration. Second, we will review a simplified circuit diagram and demonstrate how this circuit can be practically implemented. This program is written in Microsoft Quick Basic, a product of the Microsoft Corporation of Redmond, Wash. Fourth, and finally, we will demonstrate some alternate embodiments of the invention with reference to the remaining figures.

Mathematical Derivation

For the sake of simplicity and ease of understanding, a one dimensional application of this technology will first be mathematically described.

Figure 3A:
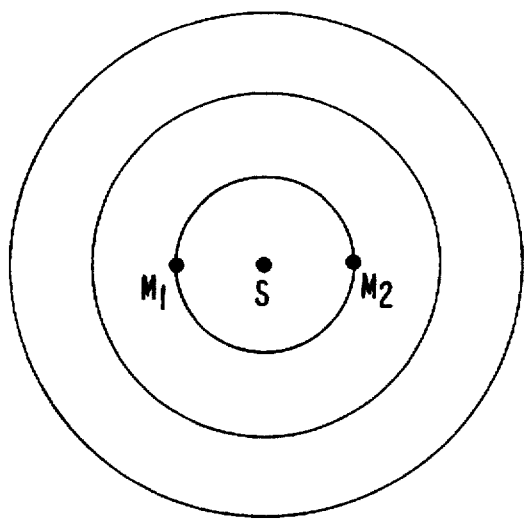
FIGS. 3A, 3B and 3C illustrate the phase/position relationship for a one dimensional embodiment of the disclosed technology and aids in the understanding of mathematical derivations.
Figure 3B:
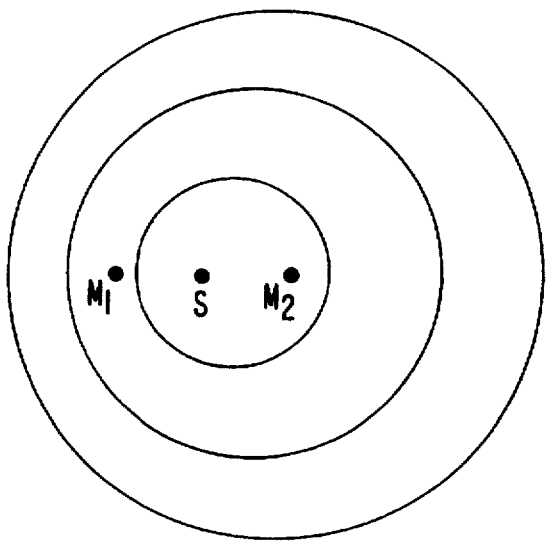
Figure 3C:
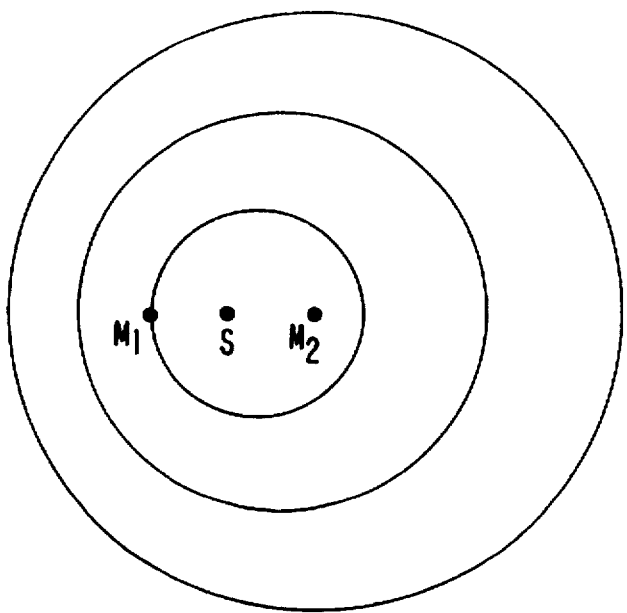

Referring to FIGS. 3A–3C, speaker S is at the point of coordinate origin; X=0. First microphone, $M_1$ is located at position X=−1 and second microphone $M_2$ is located at position X=+1. The phase locked loop varies the frequency of the transmitted sound wave such that there always exists a constant number of wavelengths, or fraction thereof, between speaker S and one fiducial microphone. As shown in FIG. 3A, $M_1$ is the fiducial microphone and the phase of the sound wave from speaker S is arbitrarily locked on one wavelength. FIG. 3A spatially shows the microphone/phase positions with no wind present. This spatial relationship is independent of temperature, or, equivalently, the speed of sound due to the constant adjustment of frequency by phase locked loop circuit 14 (See FIGS. 1 and 2). Introducing wind traveling in the positive X direction, with no frequency adjustment, would cause the familiar spatial relationship between microphone/phase positions as shown in FIG. 3B.

One may erroneously assume that the wind speed can be determined from the microphone/phase positions shown in FIG. 3B, however, that assumption can only be made if temperature, or equivalently, the speed of sound were held constant, which is not true in most, if not all, applications. With wind in the positive X direction, FIG. 3C shows the position/phase relationship being maintained between speaker S and the fiducial microphone, $M_1$, by phase locked loop circuit 14 for any temperature or wind speed parameter. FIG. 3C dramatically shows an arrangement in which only the speed of the wind will change the spatial position/phase relationship between microphone $M_2$ and the transmitted sound wave from speaker S.

Mathematically, a general expression for the distance between the apparent speaker position, P, and the two respective microphones, $M_1$ and $M_2$, can be set forth as follows:

$$(X_S-X)^2 = K^2D^2 \quad (8)$$

Where $X_S$ is the coordinate of the apparent position, P, of the sound source, speaker S, and X is the coordinate of one of the respective microphones, $M_1$ and $M_2$, and K is a temperature dependant scaler (multiplier) in units of radius which is, by design, arbitrarily normalized for one wavelength, or fraction thereof, with no wind present. The value of the scaler, K, is determined by software and will be clarified in its function and method of determination below. D is simply the apparent distance in units of wavelength.

Expanding equation (8) yields:

$$X^2 + 2X_SX + X_S^2 = K^2D^2 \quad (9)$$

For microphone $M_1$, the apparent distance, D, is always defined as, in this arrangement with the phase locked loop being in use, one wavelength. Therefore, with the spatial coordinate of microphone $M_1$ and equation (9), it can be shown that:

$$1 + 2X_S + X_S^2 = K^2 \quad (10)$$

A voltage is read by the computers' ADC (Analog to Digital Converter) which is proportional to the phase of the sound wave at the position of microphone $M_2$. Let that phase proportionate voltage be denoted as $D_{M_2}$. Therefore, with the spatial coordinate of microphone $M_2$ and equation (9), it can be shown:

$$1 - 2X_S + X_S^2 = K^2D_{M_2}^2 \quad (11)$$

Subtracting equation (11) from (10) and solving for $X_S$ yields:

$$X_s = \frac{K^2(1 - D_{M_2}^2)}{4} \quad (12)$$

For the determination of temperature dependant scaler K, we substitute our above derived expression for $X_S$ into equation (10) producing $K^2$ as a function of itself:

$$K^2 = 1 + \frac{K^2(1 - D_{M_2}^2)}{2} + \frac{K^4(1 - D_{M_2}^2)}{16} \quad (13)$$

Since the phase proportionate voltage read by the computer is, due to the inherent nature of ADC'S, not a perfect reading, a direct calculation of K is not always sure to produce an answer that has meaning in this application. Instead, a iterative fixed point numerical method is applied which converges on $K^2$, and taking the square root yields K.

Inserting the value obtained for $K^2$ into equation (12) yields a positive or negative, depending on wind direction, $X_S$ which has a magnitude that is directly proportional to wind speed.

To determine the temperature of the air, a second voltage, v, is read by the computer which is proportional to the frequency of the sound wave being emitted by speaker S. Since it is well known that:

$$\text{Frequency} = \frac{\text{Speed}}{\text{Wavelength}} \quad (14)$$

Using equations (14) and (3) and solving for absolute temperature, T, yields:

$$v \propto \frac{\sqrt{T}}{K} \rightarrow T = C_1[Kv]^2 \quad (15)$$

Where $C_1$ is a constant of proportionality.

Expanding this idea into a solution for two dimensional wind vectors is relatively simple, just adding a microphone and including the Y component in the calculations.

Figure 4:
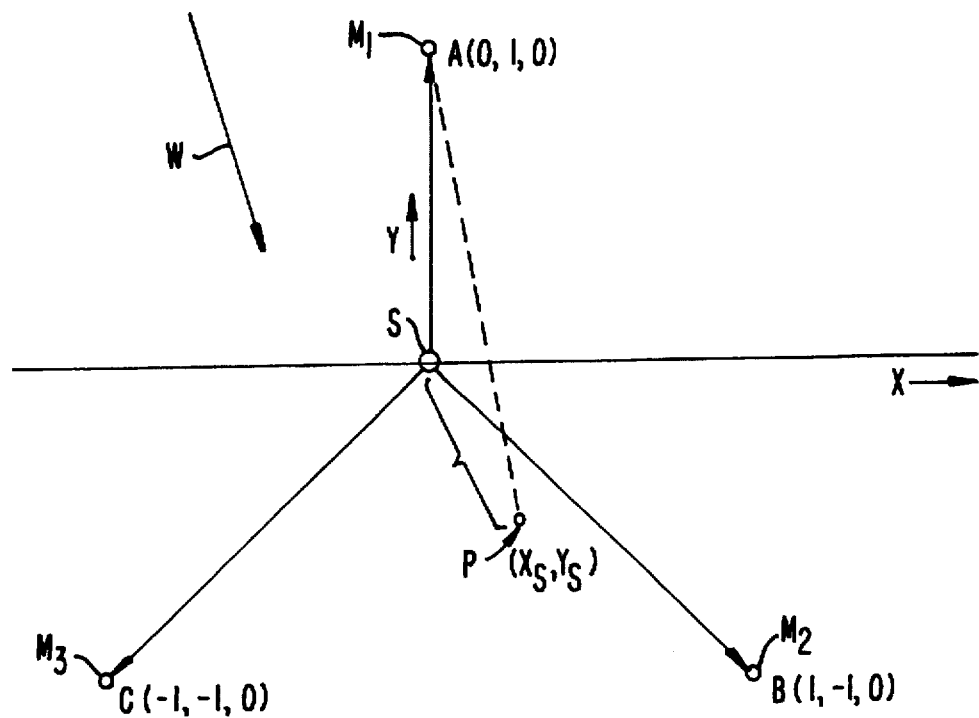
FIG. 4 is a diagrammatic schematic which is helpful in understanding the mathematical computations necessary in conjunction with a two dimensional embodiment of the disclosed technology.

First, and with respect to the mathematical derivation, FIG. 4 can be described. Speaker S is at the point of coordinate origin; X=0 and Y=0. Second, fiducial first microphone $M_1$ is at position (0, 1). Third, respective second microphone $M_2$ and third microphone $M_3$ are at (1, −1) and (−1, −1) respectively.

For simplification of the present calculation, I have not spaced the respective microphones M at 120° with equal radii; I have designated the coordinates appearing above for computational convenience.

Assuming that no wind is blowing and using the two dimensional coordinates of the transducers as shown above, the phase of the sound wave emitted by speaker S at microphones $M_2$ and $M_3$ is, by simple trigonometry, the square root of two times the phase at the fiducial, phase locked, microphone, $M_1$.

Now let us presume that wind W begins to blow across the measurement plane. First, in so far as microphones M are concerned, the source of sound will apparently shift in position. It is shown here shifted from (0, 0) to apparent speaker position P ($X_S$, $Y_S$).

Assuming wind is present, the displacement of apparent speaker position, P, from one of the microphones, M, can be generally expressed as:

$$(x_S-x)^2 + (y_S-y)^2 = K^2D^2 \quad (16)$$

where D i s the apparent displaced distance between the receiving microphone located at (X, Y) and apparent position, P, of speaker S located at ($X_S$, $Y_S$,) due to wind W while K is a temperature dependent scaler (multiplier).

Expanding equation (16):

$$x_S^2 - 2x_Sx + x^2 + y_S^2 - 2y_Sy + y^2 = K^2D^2 \quad (17)$$

It will now be remembered that the phase of the emitted sound wave is locked on the first microphone. Let the phase be locked such that the distance between the apparent position, P, of speaker S and microphone $M_1$ is one wavelength. Let the distance between microphone $M_1$ and speaker S be denoted as $KD_{M_1}$ (substituting $D_{M_1}$ for D in equation (17)). It is, therefore, always true, with the frequency adjustment by the phase locked loop circuit, that the distance $KD_{M_1} = \lambda$ in units of radius for any temperature or wind speed parameter.

Solving for the distance between the apparent position, P, of speaker S and each of the microphones, $M_1$, $M_2$, and $M_3$, we generate the following equations:

$KD_{M_1}$ denotes the apparent distance for the first microphone, $M_1$:

$$1 - 2y_S + x_S^2 + y_S^2 = K^2D_{M_1}^2 = K^2 \quad (18)$$

The distance is simply K in units of radius since, as always, $D_{M_1} \equiv 1$ wavelength as shown above.

$KD_{M_2}$ denotes the apparent distance for the second microphone, $M_2$:

$$2 - 2x_S + 2y_S + x_S^2 + y_S^2 = K^2 D_{M_2}^2 \tag{19}$$

$KD_{M_3}$ denotes the apparent distance for the third microphone, $M_3$:

$$2 + 2x_S + 2y_S + x_S^2 + y_S^2 = K^2 D_{M_3}^2 \tag{20}$$

Where $D_{M_2}$ and $D_{M_3}$ are the voltages read by the computer which are proportional to the phase of the received sound wave at second microphone $M_2$, and third microphone $M_3$, respectively.

Determining the coordinates of the wind shifted, apparent source of sound, $(X_S, Y_S)$, shall define a vector that is directly proportional to wind speed and direction.

Subtracting equation (20) from equation (19) and solving for the $X_S$ component of wind vector W yields:

$$X_s = \frac{K^2(D_{M_3}^2 - D_{M_2}^2)}{4} \tag{21}$$

Subtracting equation (20) from equation (18) and solving for the $Y_S$ component of wind vector W yields:

$$Y_s = \frac{K^2(D_{M_2}^2 + D_{M_3}^2 - 2) - 2}{8} \tag{22}$$

Substituting the above derived expressions for $X_S$ and $Y_S$ into equation (18) yields:

$$K^2 = 1 - \frac{K^2(D_{M_2}^2 + D_{M_3}^2 - 2) - 2}{4} + \frac{K^4(D_{M_3}^2 - D_{M_2}^2)^2}{16} + \frac{K^4(D_{M_2}^2 + D_{M_3}^2 - 2) - 4K^2(D_{M_2}^2 + D_{M_3}^2 - 2) + 4}{64} \tag{23}$$

Substituting the numerically calculated scaler, $K^2$, and the phase proportionate voltages, $D_{M_2}$ and $D_{M_3}$, back into the derived expressions for $X_S$ and $Y_S$ defines a vector which is directly proportional to the wind vector, W.

Application of the Pythagorean theorem yields the magnitude of the wind vector or speed of the wind.

$$\text{Wind Speed} \propto \sqrt{X_s^2 + Y_s^2} \tag{24}$$

Application of simple trigonometry, the inverse tangent function, yields the directional component of the wind vector.

It will be seen with respect to FIG. 4, that the algebraic solution here proposed is a great simplification. Presuming that speaker S continuously generates signals varying in frequency as demanded by phase locked loop circuit 14, determination of the wind vector, W, requires that only two voltages need to be read, $D_{M_2}$ and $D_{M_3}$ (see Equations (19) and (20)).

Temperature measurement requires the reading of a third voltage which is proportional to the lock-on frequency, v, of phase locked loop circuit 14. Because $D_{M_1} \equiv 1$ wavelength unit with the phase always being locked, the numerically solved for, K, is proportional to the wave length, $\lambda$, in units of radius. With this information and equations (14) and (3), it can be shown that:

$$v \propto \frac{\sqrt{T}}{K} \rightarrow T = C_1 (Kv)^2 \tag{25}$$

where $C_1$ is a constant of proportionality.

It can therefore been seen that the algebraic solution to the problem is simplified where a constant number or fraction of sound wavelengths is continuously maintained between speaker S and first microphone $M_1$.

Electronics

Having set forth the mathematics demonstrating the effectiveness of this device, I outline a electronic circuit that I have actually constructed to experimentally verify device operation.

Figure 5:
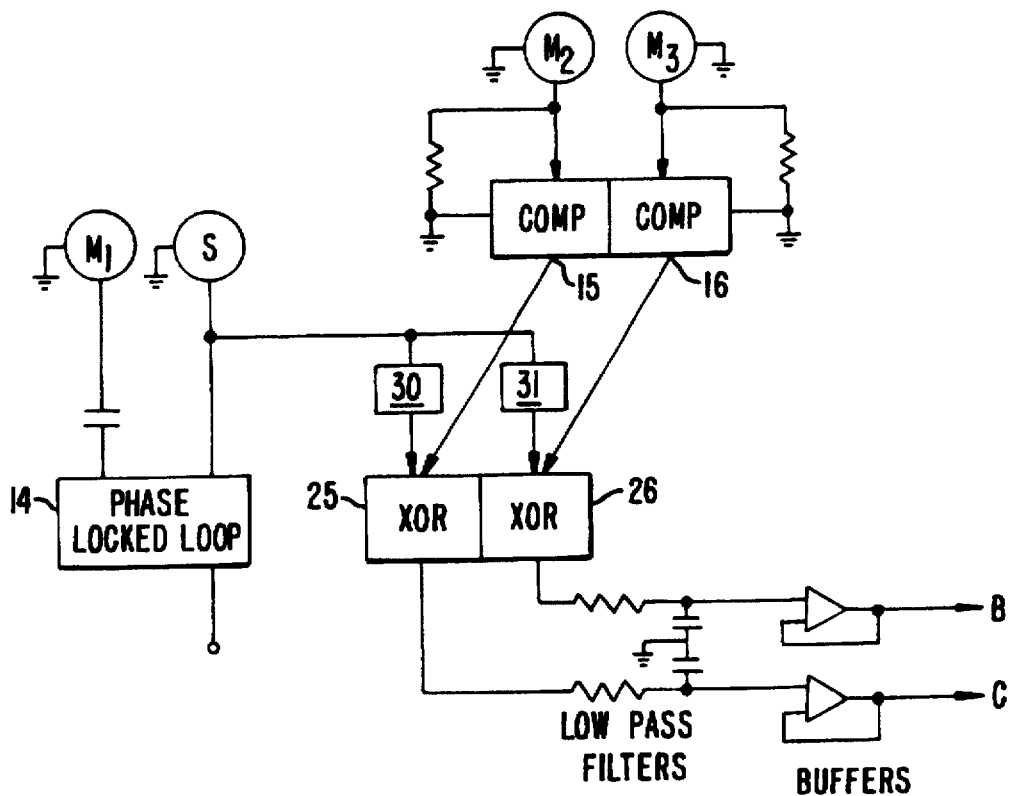
FIG. 5 is a electronic schematic of the required circuitry for measuring the speed, direction and temperature of wind traversing the measurement plane for a two dimensional embodiment of the disclosed technology.

Referring to the simplified electronic circuit diagrammed in FIG. 5, speaker S, because of its limited bandwidth, acts as a band pass filter, converting the square wave from phase locked loop 14 into a sinusoid, emitting a continuous sound wave which is variable in frequency. Conversely, comparators 15 and 16 convert the received sine wave from the microphones, $M_2$ and $M_3$, into square waves. The signal from microphone $M_1$ is AC coupled to the phase locked loop's self biasing amplifier and phase compared with the voltage controlled oscillator output (this being integral to phase locked loop 14 and therefore not being shown). Any phase difference is immediately compensated for, thus maintaining a continuous phase lock and assuring that a constant number of wavelengths shall exist between speaker S and microphone $M_1$.

The square wave signal being sent from the phase locked loop circuit to speaker S is exclusively OR'ed (XOR) at gates 25, 26 with the square wave signals from the comparators 15 and 16. The outputs of the XOR logic gates are low pass filtered, removing the high frequency component of the signal, producing smooth and continuous voltages which are proportional to the phase difference between received and transmitted sound waves. The phase proportionate voltages are read by the computer and manipulated with software as described above to determine temperature compensated wind speed and direction. An additional voltage may be read by the computer from the phase locked loop which is proportional to the lock on frequency. This third voltage is manipulated with software to determine the temperature of the air as described above.

In the preferred embodiment, two phase shifting circuits 30, 31 (one for each channel) are provided between the phase locked loop and each of the XOR gates. This phase adjustment is effected so that, with no wind present, the phase can be manually adjusted, set, and left alone there after, making the phase proportionate voltages, $D_{M_2}$ and $D_{M_3}$, to be at the mid range of the available voltages read by the computer. This phase adjustment has the function of maximizing the dynamic range of measurable wind speeds.

Alternate Embodiments

The reader will understand that the above described technology can be implemented in one, two, and three dimensions. For an instrument configuration of N dimensions, one transmitting transducer (speaker) is required and N+1 receiving transducers (microphones) are required. This is easily seen by reviewing the mathematical derivation and understanding how the configuration of the one dimensional instrument was expanded into the two dimensional instrument.

It is possible to generate solutions to the N dimensional, N+1 microphone embodiment where phase locked loop circuit 14 is not utilized and a fixed frequency is used instead. If one were to use a fixed frequency instrument, extreme variations in operational temperatures would place limits on the measurement range of the device. In high heat, sound wave expand in length so that the device would lose its range of measurable wind speeds. In extreme cold, sound waves contract in length and, again, the device would lose its range of measurable wind speeds. By keeping the same number of sound wavelengths between speaker S and microphone $M_1$, continuous calibration to ambient air temperature occurs, maintaining the wide range of measurable wind speeds. Practical operation can occur between −40° to 100° C., the operational temperature range of commonly available ultrasonic transducers.

It will also be understood that this technology does not necessarily dictate that the measuring instrument be very small in size. Separating the transducers by many wavelengths may occur by modulating a high frequency carrier with a lower frequency sinusoid which can either be of a phase locked variable frequency or of a fixed frequency as described above.

Alternate, less than perfect, device configurations to that presented above are possible. For example, an N dimensional version of this device can be made using one speaker and only N sound receiving transducers (microphones). In this embodiment, a less than perfect solution to wind direction occurs. Temperature measurement must be made independent of the sound wave transducers so that the phase proportionate voltages read by the computer can be normalized, providing valid data. This temperature measurement can be accomplished utilizing either a thermosistor or semiconductor device. Errors in the calculation of the wind vector may occur due to the limited dynamic response or time lag of the temperature measuring device.

Another alternate, less than perfect N dimensional embodiment using N microphones would be to locate a speaker and microphone, external to wind measuring transducers, shielded from the wind to be measured, that is emitting and receiving a sound wave that is phase locked, providing an operational frequency for the temperature compensation of the wind measuring transducers. This embodiment would have errors due to dynamic response as well as employ more transducers than what is provided for in the preferred embodiment.

Mathematically, solutions to the above described, alternate, less than perfect device configurations of N dimensional, N microphone embodiments are not unique. This allows for the possibility of computational error.

What is claimed is:

1. An anemometer comprising in combination:
   a measurement plane disposed to have wind for measurement passing parallel to the measurement plane;
   a sound generating transducer generating sound at a central location;
   one fiducial sound receiving transducer for receiving sound from the sound generating transducer;
   means for maintaining a constant sound wavelength between the fiducial sound receiving transducer and the sound generating transducer operatively connected between the sound generating transducer and the fiducial sound receiving transducer independent of wind velocity and air temperature;
   at least one additional sound receiving transducer for receiving sound from the sound generating transducer on the measurement plane, the one additional sound receiving transducer being located on a radial from the sound generating transducer which does not intersect the fiducial sound receiving transducer; and,
   computational means for converting phase of signal received at the fiducial sound receiving transducer and the at least one additional sound receiving transducer into a component of the speed of wind and direction of wind across the measurement plane.

2. An anemometer according to claim 1 comprising in further combination:
   the sound generating transducers and the sound receiving transducers are addressed normally to the measurement plane.

3. An anemometer according to claim 1 comprising in further combination:
   at least two sound receiving transducers in addition to the fiducial sound receiving transducer, both said two sound receiving transducers being located on radial from the sound generating transducer which do not include any other sound receiving transducers; and
   said computer means additionally for converting the phase of the signal received at the first fiducial sound receiver transducer and the two sound receiving transducers into a temperature.

4. An anemometer according to claim 1 comprising in further combination:
   the measurement plane is bounded by an acoustically reflective surface.

5. An anemometer according to claim 4 comprising in further combination:
   the measurement plane has an acoustically reflective surface overlying and underlying the measurement plane.

6. A method of measuring wind speed and direction including the steps of:
   providing a measurement plane disposed to have wind for measurement passing parallel to the measurement plane;
   generating sound from a sound generating transducer at a central location with respect to the measurement plane;
   providing one fiducial sound receiving transducer for receiving sound from the sound generating transducer;
   maintaining a constant sound wavelength between the fiducial sound receiving transducer and the sound generating transducer independent of wind velocity and air temperature;
   providing at least two additional sound receiving transducers for receiving sound from the sound generating transducer on the measurement plane, the one additional sound receiving transducer being located on a radial from the sound generating transducer which does not intersect the fiducial sound receiving transducer; and,
   converting phase of signal receipt at the at least two additional sound receiving transducers into speed, direction of wind across the measurement plane.

7. A method of measuring wind speed and direction according to claim 6 and including the additional steps of:
   providing at least one sound reflecting surface adjacent the measurement plane.

8. A method of measuring wind speed and direction according to claim 6 and including the additional steps of:
   determining the temperature of the wind utilizing the frequency of the sound generating transducer.

* * * * *